July 2, 1957
B. E. LLOYD
2,798,033
SEPARATION OF METHANOL FROM AQUEOUS FORMALDEHYDE
Filed Jan. 7, 1954
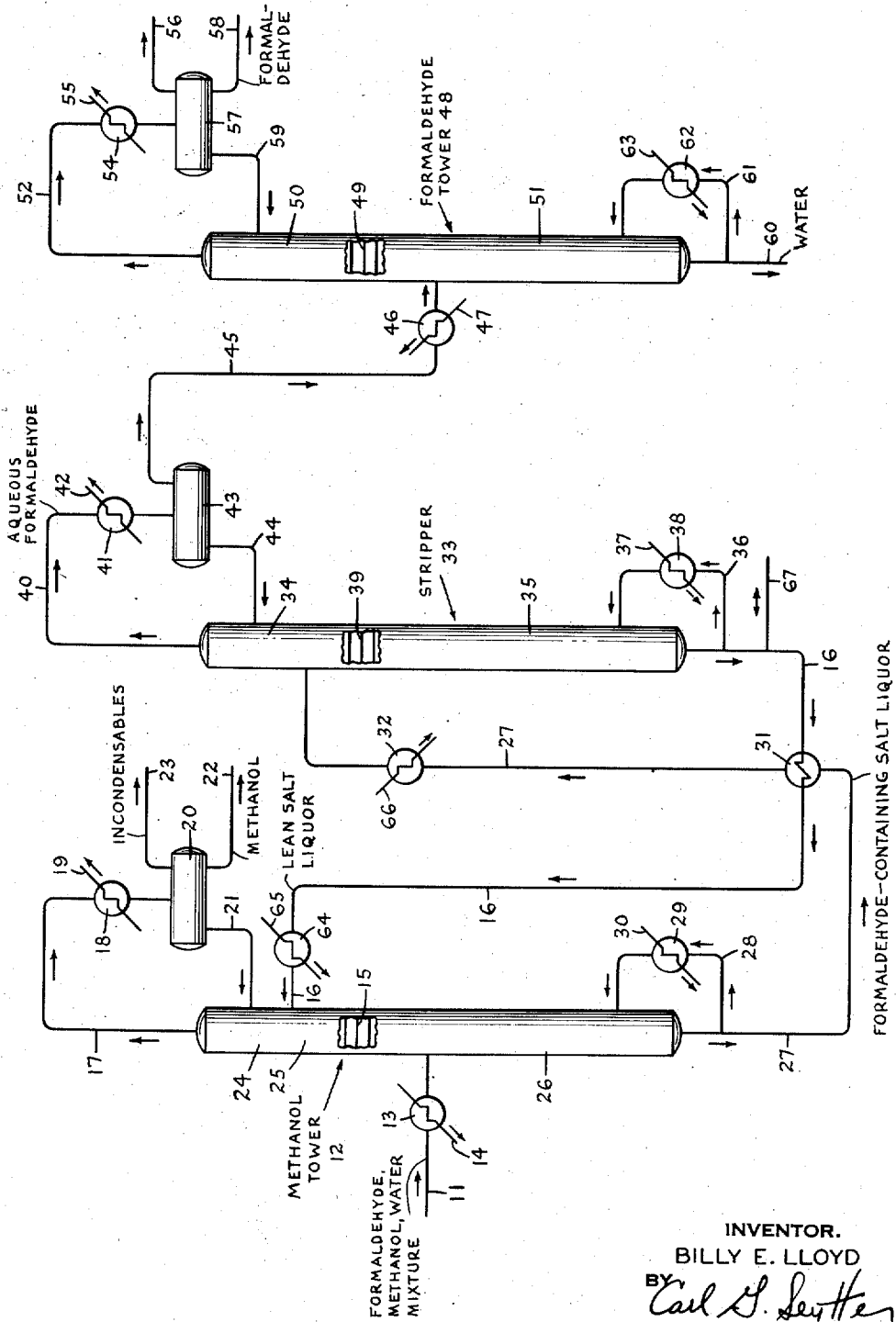
INVENTOR.
BILLY E. LLOYD
BY
Carl G. Seutter
ATTORNEY.

2,798,033

SEPARATION OF METHANOL FROM AQUEOUS FORMALDEHYDE

Billy E. Lloyd, Chester, Va., assignor to Allied Chemical & Dye Corporation, New York, N. Y., a corporation of New York Application January 7, 1954, Serial No. 402,793

17 Claims. (Cl. 202—39.5)

This invention relates to the separation of methanol from aqueous formaldehyde by distillation in the presence of slats.

As is generally known to those skilled-in-the-art, formaldehyde may be prepared by the catalytic oxidation of methanol in the vapor phase. Liquid formaldehyde product thus made, after separation from uncondensable gases such as carbon dioxide, contains water produced by the oxidation of the product formaldehyde, in addition to unreacted methanol. Purification of this crude product with obtention of high overall plant efficiencies, involves the separation therefrom of all the methanol in form containing minimum amounts of water and formaldehyde, and the separate recovery of methanol-free aqueous formaldehyde in concentrations suitable for use as commercial concentrated solution i. e. containing at least 37% by weight of formaldehyde.

Prior art processes which have been employed to effect the separation of methanol, formaldehyde, and water from mixtures have been characterized by one or more of the following: (a) separation of all the methanol from the bulk of the charge with such large amounts of formaldehyde as to make further rectification of this methanol necessary or to result in recycle to the methanol oxidation reaction of disproportionately large amounts of formaldehyde; (b) inability to separate all the methanol from the mixture, resulting in production of concentrated aqueous formaldehyde product which does not meet specifications without further purification; (c) addition to the mixture of comparatively large amounts of undesirable or difficultly separable materials to inefficiently effect the desired separation; (d) use of equipment requiring high capital outlay, including towers of large diameter and many decks, as well as more expensive materials of construction, e. g. stainless steel; (e) high operating costs based on pumping of comparatively large amounts of absorbent, recycle, or reflux, and high heat costs based on large reflux or reboiler duties.

The primary purpose of this invention is to provide a simple, inexpensive, highly efficient process for separating substantially pure methanol from mixtures thereof with water and formaldehyde, so that the methanol is suitable for recycle to a methanol oxidation operation. A second purpose is to effect such a separation that the aqueous formaldehyde remaining is of such purity (i. e. sufficiently methanol-free) that it is or may readily be converted to high purity formaldehyde. Further purposes and advantages will be apparent to those skilled-in-the-art on inspection of the following description.

This invention comprises a method of separating a mixture of formaldehyde, water, and methanol into (a) enriched methanol substantially free of formaldehyde and (b) enriched formaldehyde substantially free of methanol. In its practice the mixture is distilled in the presence of one or more inert (i. e. non-reactive with aqueous formaldehyde and methanol under the conditions of operation) salts of metals which preferably have a solubility of at least 10 parts by weight of salt in 100 parts by weight of water at 50° C., these salts which are generally highly ionized being hereafter designated as inert, water soluble salts. Typical of salts falling within this group is aluminum sulfate. A preferred subgroup of metal salts falling within this group are those salts of the commonly occurring solid metals in groups I and II of the periodic table with a radical selected from the group consisting of the sulfate radical, the acetate radical, and the chloride radical. The commonly occurring solid metals forming salts falling within this subgroup are lithium, sodium, potassium, calcium, strontium, barium, magnesium, zinc, and cadmium. The salt employed may have one or more of the above anions or cations contained therein, or alternatively, mixtures of compatible salts may be employed (i. e. salts which when mixed do not form precipitates). A typical compatible mixture is the mixture of sodium acetate and magnesium chloride. In the presence of this salt or salts, the volatility relationships of the components of the mixture are such that, contrary to expectation, the methanol present in the mixture may be recovered as enriched distillate, the residue containing the formaldehyde and being substantially free of methanol. The overhead, under preferred conditions of operation is sufficiently pure methanol to permit its recycle to the methanol-oxidation operation. The residue is sufficiently pure in the preferred operation that upon being stripped from the salt content thereof, it is or may be readily converted to aqueous formaldehyde of high concentration and purity meeting U. S. P. standards.

According to one embodiment of this invention, a charge solution containing methanol, water, and formaldehyde is admitted to a methanol tower, preferably at a pressure less than atmospheric. An aqueous salt solution preferably of an ionized, inert, water-soluble salt as hereinbefore defined, is simultaneously admitted to the tower at a point above that at which charge is admitted. Overhead from this tower, containing substantially all the methanol in the charge may be condensed and refluxed. Bottoms, comprising a mixture of formaldehyde, water, and salt and substantially free of methanol, are reboiled before being passed to a stripper. Here aqueous formaldehyde is stripped from the salt solution preferably at superatmospheric pressure to yield as overhead pure methanol-free aqueous formaldehyde, and as bottoms an aqueous solution of the salt, which latter is recycled as lean liquid to the methanol-tower. The stripper may have a reflux circuit to provide sufficient return to insure that the overhead is free of salt. Stripper overhead, as either gas or liquid, is passed to superatmospheric formaldehyde tower from which concentrated formaldehyde is withdrawn as overhead and water, free of formaldehyde, is withdrawn as bottoms.

The foregoing embodiment and modifications of the process of this invention may be described in connection with the attached drawing which is a diagrammatic flow sheet.

According to one typical embodiment of this invention as shown in the drawing, a charge stock containing a mixture of formaldehyde, water and methanol is received at line 11. This charge may contain the three components in any relative quantities. For example, streams containing these substances, with content of 1% to 75% or more of methanol with corresponding quantities of formaldehyde and water may be effectively processed by the process of this invention. As illustrative of compositions of feed, the components may be present in at least the amount shown in the minimum column of Table A below and typically up to the amount shown in the maximum column expressed as percent by weight. The example column shows percentages by weight of one typical mixture of charge stock.

Table A

|  | Minimum | Maximum | Example, percent |
|---|---|---|---|
| Formaldehyde | 30 | 50 | 37.8 |
| Methanol | 5 | 30 | 10.4 |
| Water | 20 | 65 | 51.8 |
|  |  |  | 100.0 |

The charge stock in line 11 may be heated in exchanger 13 as by steam in line 14 to 70° F. to 210° F., say 170° F., and passed to methanol-tower 12 which may be operating at a pressure which although it may be somewhat more than atmospheric pressure, is preferably less than atmospheric pressure, for example 200 mm. Hg to 400 mm. Hg, say 300 mm. Hg at the feed point, i. e. that portion of the tower into which charge in line 11 is admitted. Charge liquid in line 11 is admitted to tower 12 at a temperature near its boiling point at operating pressure of the tower. Upwardly ascending vapors in tower 12 pass through absorption section 25 wherein they are contacted with aqueous salt-containing liquid which is admitted through line 16 into the top of the absorption section 25. This lean liquid absorbing medium admitted at a temperature of 120° F. to 160° F., say 140° F., may be an aqueous solution of an inert (i. e. non-reactive with formaldehyde and methanol under the conditions of operation) salt of a metal which preferably has a solubility of at least 10 parts by weight of salt in 100 parts by weight of water at 50° C. Preferably the lean liquid in line 16, will be an aqueous solution of a salt of a commonly occurring solid metal in Groups I and II of the periodic table with a radical selected from the group consisting of the sulfate radical, the acetate radical, and the chloride radical.

Typical salts found to be useful in practice of this invention are listed in the following Table B. Although separation of the various components of the charge may be effected in accordance with this invention when employing wide range of concentrations of salts, in a typical operation the salts will be present in the lean liquid in line 16 at the entrance to tower 12 in concentration of at least 10%, i. e. 10 parts by weight of salt per 100 parts by weight of solution. This may be quivalent under normal operation to a concentration of say 5% when expressed in terms of parts by weight of salt per 100 parts by weight of total liquid in the feed zone. The maximum concentration of salt in the tower 12 is preferably controlled by the solubility of the salt in the liquid in the tower; i. e. under preferred conditions concentration of salt will be less than that concentration which would permit precipitation or deposition of salt in tower 12. Table B notes maximum and typical concentrations of selected salts expressed in terms of parts by weight of salt per 100 parts by weight of solution as they exist in line 16 at the entrance to the tower 12.

Table B

| Salt | Maximum | Example |
|---|---|---|
| Calcium chloride | 65 | 60 |
| Magnesium chloride | 40 | 38 |
| Zinc chloride | 85 | 80 |
| Magnesium sulfate | 36 | 32 |
| Sodium acetate | 62 | 60 |

Hereafter the salt used will be designated as calcium chloride, it being understood that the other salts or compatible mixtures thereof hereinbefore indicated as being useful in the practice of this invention may be substituted therefor.

Under the conditions of operation in the absorption section 25, the relative volatility of methanol with respect to the formaldehyde-water mixture, is substantially increased, due to the presence of calcium chloride. The rectification-absorption or extractive distillation conducted under these conditions is very efficient and permits separation of methanol with minimum heat consumption and decreased liquid and vapor loads resulting in a small tower having few decks. Overhead from this absorption section 25 contains substantially all of the methanol which entered the tower through line 11.

The ratio of liquid to vapor in the absorption section 25 is dependent on the composition of the charge, the temperature and pressure of operation, and the particular concentration and composition of the lean liquid in line 16. When employing aqueous calcium chloride in 60% concentration at temperature of 140° F., and maintaining the other conditions as set by this typical embodiment, the weight ratio of lean liquid to feed to tower 12, for example may be 0.8:1 to 0.3:1, say 0.5:1.

Lean vapors rising from the top of absorption section 25 wherein they have been contacted with the lean liquid from line 16, contain substantially all the methanol which was in the charge in line 11, along with smaller amounts of formaldehyde and water. These vapors may be withdrawn from the tower 12 at this point and e. g. passed back to a methanol oxidation unit wherein formaldehyde is produced. Vapors as this point are of sufficiently high methanol concentration to be recycled as such, but preferably they are further rectified as hereinafter indicated before being so recycled. This is accomplished in the upper portion 24 of tower 12 which serves as a rectification section and which may have fewer decks than absorption section 25. Overhead from rectification section 24 at a temperature of 100° F. to 140° F., say 115° F. may be withdrawn from the top of tower 12 through line 17, condensed in exchanger 18 cooled as by water in line 19, and collected in drum 20. Non-condensables, if present, are withdrawn through line 23, and reflux is returned to rectifying section 24 through line 21. This reflux which need only be sufficient for the upper decks in tower 12 will ordinarily be sufficient to maintain reflux ratio of reflux to net product in line 22 of from 5:1, to 15:1, say 10:1.

When methanol-containing reflux is returned to methanol tower 12, it may serve as means of admitting at least a portion of the calcium chloride to the tower. Calcium chloride, either in solid or liquid form, may be admitted for example to line 21 as a substitute or supplement for salt solution supplied through line 16. Alternatively or additionally salt may be added as solid or solution to feed in line 11.

The overhead product withdrawn through line 22 usually contains above 70% methanol, for example, about 85% or more, as up to 98%, with formaldehyde being present usually in amount of 5% or less, even 1% or less. The balance of this distillate is water. Typical ranges of the content of each of the three substances, percent by weight of total, lie between the minimum and maximum values in Table C, which also presents an illustrative composition of the distillate.

Table C

| Component | Minimum | Maximum | Example, percent |
|---|---|---|---|
| Methanol | 70 | 98 | 85.9 |
| Water | 1 | 20 | 9.4 |
| Formaldehyde | 1 | 10 | 4.7 |
|  |  |  | 100.0 |

Liquid from line 11 admitted to tower 12 will be commingled with downflowing liquid from absorption section 25, passed downwardly through the tower and withdrawn as bottoms through line 27. At least a portion of the bottoms is reboiled by withdrawal through line 28 and passage through reboiler 29, heated as by steam in line 30. The reboiled bottoms are then passed back to tower 12. Section 26 of the tower serves as a stripping section, and insures that traces of methanol in the bottoms are removed therefrom. Bottoms removed in line 27 at 175° F. to 215° F., say 195° F., typically contain concentrations of components within the range defined by the minimum and maximum values set forth in Table D, the values varying somewhat depending upon conditions of operation as well as upon composition of charge.

Table D

| Component | Minimum | Maximum | Example, percent |
|---|---|---|---|
| Formaldehyde | 25 | 30 | 28.7 |
| Water | 50 | 60 | 51.0 |
| Calcium chloride | 15 | 22 | 19.6 |
| Methanol | 0.2 | 1.6 | 0.7 |
|  |  |  | 100.0 |

Formaldehyde- and salt-rich liquid in line 27 may be heated as by heat exchanger 31 against bottoms in line 16 hereinafter referred to. Further heating in exchanger 32 as by steam in line 66 may be performed, if necessary, the liquid in line 27 preferably being at a temperature of 200° F. to 240° F., say 220° F. as admitted to stripper 33. Preferably, the liquid in line 27 is near its boiling point at the operating pressure in stripper 33. Operating pressure here may be below, at, or somewhat above atmospheric, for example up to 2 atmospheres or above. Preferred pressure is substantially atmospheric or above, i. e., at least 700 mm. Hg. Liquid remaing after the vapor is flashed off, is mixed with other downwardly flowing liquid and passed to stripping zone 35 containing decks 39. Although steam stripping may be employed, preferably at least a portion of the bottoms withdrawn through line 16 is passed through line 36 and reboiler 38 heated as by steam in line 37. Upflowing vapors in stripping section 35 serve to remove substantially all the formaldehyde from the liquid removed through line 16.

Bottoms liquid in line 16 is essentially an aqueous solution of calcium chloride at a temperature of 265° F. to 305° F., say 285° F., which contains very small quantities to no formaldehyde. Addition of make-up calcium chloride thereto may be made as solid or solution by line 67. Alternatively, to adjust concentration of the solution, steam may be withdrawn from a suitable lower level of stripper 33 by a vapor tap, not shown. Concentrations as percent by weight of the components of the liquid in line 16 preferably lie within the maximum and minimum limits set forth in Table E when using calcium chloride. Table E also presents a typical composition obtained.

Table E

| Component | Minimum | Maximum | Example, percent |
|---|---|---|---|
| Water | 35 | 53 | 38.5 |
| Calcium chloride | 45 | 65 | 60.3 |
| Formaldehyde | 0.5 | 2 | 1.2 |

It will be understood that other concentrations of calcium chloride solutions and of solutions of salts other than calcium chloride may be obtained and effectively serve the purposes of the invention.

This warm lean liquid may be cooled as by heat exchange in exchanger 31 against the stripper feed, and further if desired in exchanger 64, as by cooling medium in line 65 to 120° F. to 160° F., say 140° F. as hereinbefore indicated. This cooled lean liquid is then passed to the top of absorption section 25 of methanol-tower 12.

Vapors liberated in stripper 33, may be withdrawn as pure methanol-free aqueous formaldehyde but they will preferably be rectified further as in rectification section 34 wherein any salt which might otherwise be in the overhead will be washed therefrom. Salt-free overhead in line 40 at 200° F. to 220° F., say 210° F., may be withdrawn and condensed in part in exchanger 41 as by water in line 42, the condensate being collected in condensate drum 43. At least sufficient overhead may be condensed to serve as wash for prevention of entrainment of salt solution and to insure maintenance of the overhead in salt-free condition.

Overhead from stripper 33 may be passed through line 45 to formaldehyde tower 48. If necessary, the temperature of the formaldehyde-water mixture in line 45 may be adjusted as by heating or cooling in exchanger 46 by heating or cooling agent in line 47, before being admitted to tower 48. Preferably, tower 48 will be operated at superatmospheric pressure, say two atmospheres. Liquid flowing downwardly past the point of admission will pass through decks 49 and be stripped of formaldehyde as it descends through stripping section 51. This is insured by withdrawal of at least a portion of the bottoms from line 60, through line 61 to be reboiled in exchanger 62 as by steam in line 63. Liquid withdrawn in line 60 is substantially pure water, free of formaldehyde.

Overhead from formaldehyde tower 48 is withdrawn therefrom through line 52, condensed in condenser 54 as by water in line 55, and collected in condensate drum 57. Reflux is returned through line 59 to tower 48 to maintain a reflux ratio of reflux to net product of 0.5:1 to 5:1, say 1:1.

Formaldehyde product is removed as liquid through line 58 and will be substantially free of methanol. Typical product compositions with reference to each component as percent by weight of product lie between the maximum and minimum values set forth in Table F. An illustrative product composition is also given. Non-condensables if present may be removed through line 56.

Table F

| Component | Minimum | Maximum | Example, percent |
|---|---|---|---|
| Formaldehyde | 37.0 | 50.0 | 42.0 |
| Water | 48.5 | 61.5 | 57.1 |
| Methanol | 0.4 | 1.5 | 0.9 |

In practice of the process of this invention, the effective quantities of salt as related to the total liquid content of the feed zone of tower 12 will tend to vary to some extent with differences in the charge and with the particular salt used. Most if not all of the suitable salts are effective over relatively wide ratios of salt to liquid. Concentrations of about 20% of salt, expressed in terms of parts by weight of salt per 100 parts by weight of total liquid in the feed zone have been used effectively. With calcium chloride, excellent results are obtained when the concentration thereof is in the range of 18% to 24% on the basis noted.

As will be apparent to those skilled in the art, auxiliary process equipment including pumps may be supplied in appropriate places where needed.

The term "methanol-free formaldehyde" is herein employed to indicate a water-formaldehyde mixture enriched in formaldehyde and containing very little, if any, methanol, generally less than 1.5% by weight thereof; similarly the term "formaldehyde-free methanol" is herein employed to indicate a mixture enriched in methanol and containing very little, if any, formaldehyde, generally less than 10% by weight thereof.

I claim:

1. The method of separating methanol from a mixture consisting essentially of methanol, formaldehyde and water which comprises subjecting said mixture to extractive distillation in direct contact with an aqueous solution of a water-soluble salt which is chemically inert with respect to methanol and formaldehyde, withdrawing methanol-containing overhead from said extractive distillation, and withdrawing formaldehyde-containing substantially methanol-free bottoms from said extractive distillation.

2. The method as claimed in claim 1 wherein said salt is aluminum sulfate.

3. The method of separating methanol from a mixture consisting essentially of methanol, formaldehyde and water which comprises subjecting said mixture to extractive distillation in direct contact with an aqueous solution of a water-soluble salt which is chemically inert with respect to methanol and formaldehyde, having as cation a commonly occurring solid metal selected from the group consisting of those metals in Groups I and II of the periodic table and as anion a radical selected from the group consisting of the sulfate radical, the acetate radical, and the chloride radical.

4. The method of separating methanol from a mixture consisting essentially of methanol, formaldehyde and water which comprises distilling said mixture, countercurrently contacting the same during its distillation with downwardly flowing liquid containing a water-soluble salt which is chemically inert with respect to methanol and formaldehyde, having as cation a commonly occurring solid metal selected from the group consisting of those metals in Groups I and II of the periodic table and as anion a radical selected from the group consisting of the sulfate radical, the acetate radical, and the chloride radical whereby the relative volatility of methanol with respect to said formaldehyde and water is increased in the presence of said salt, withdrawing overhead containing substantially all the methanol from said distilled mixture, and withdrawing bottoms of salt-containing substantially methanol-free aqueous formaldehyde.

5. The method as claimed in claim 4 wherein said salt is calcium chloride.

6. The method as claimed in claim 4 wherein said salt is magnesium sulfate.

7. The method as claimed in claim 4 wherein said salt is potassium acetate.

8. The method as claimed in claim 4 wherein said salt is magnesium chloride.

9. The method of separating methanol from a mixture consisting essentially of methanol, formaldehyde and water which comprises distilling said mixture, countercurrently contacting the same during said distillation with a lean liquid containing a water-soluble salt which is chemically inert with respect to methanol and formaldehyde, having as cation a commonly occurring solid metal selected from the group consisting of those metals in Groups I and II of the periodic table and as anion a radical selected from the group consisting of the sulfate radical, the acetate radical, and the chloride radical whereby the relative volatility of methanol with respect to formaldehyde and water is increased in the presence of said salt, withdrawing overhead containing substantially all the methanol from said mixture, stripping downwardly flowing liquid within said distillation operation whereby the same is substantially methanol-free, withdrawing bottoms containing substantially methanol-free aqueous formaldehyde, stripping said bottoms to recover therefrom concentrated substantially methanol-free aqueous formaldehyde as stripper overhead vapor, and recycling said stripped bottoms to said contacting operation as lean liquid.

10. The method of separating methanol from a mixture consisting essentially of methanol, formaldehyde and water which comprises distilling said mixture of methanol, formaldehyde, and water, countercurrently contacting upwardly ascending vapors during said distillation with a lean liquid containing calcium chloride whereby the relative volatility of methanol with respect to formaldehyde and water is increased in the presence of said salt, withdrawing overhead containing substantially all the methanol from said mixture, stripping downwardly flowing liquid within said distillation operation whereby the same is substantially methanol-free, withdrawing bottoms containing substantially methanol-free aqueous formaldehyde, stripping said bottoms to recover therefrom concentrated substantially methanol-free aqueous formaldehyde as stripper overhead vapor, and recycling said stripped bottoms to said contacting operation as lean liquid.

11. The method of separating methanol from a mixture consisting essentially of methanol, formaldehyde and water in a distillation column which comprises admitting said liquid as charge to a feed point in said column, admitting lean liquid containing a water-soluble salt which is chemically inert with respect to methanol and formaldehyde, to an upper portion of said column whereby an absorption section is formed between said feed point and said point of admission of said lean liquid, passing upflowing vapors from said feed point through said absorption section wherein the relative volatility of methanol is substantially greater than that of the formaldehyde and water in the presence of said salt, withdrawing methanol-containing vapor from above the point of admission of said lean liquid, passing downflowing liquid from said feed point through a stripping section in said column wherein substantially all the methanol from said charge is stripped from said downwardly flowing liquid, withdrawing substantially methanol-free bottoms from said column, stripping formaldehyde from said bottoms, and returning said stripped bottoms as lean liquid to said absorption section.

12. The method of separating methanol from a mixture consisting essentially of methanol, formaldehyde and water in a distillation column as claimed in claim 11 wherein said countercurrent contacting operation operates at the subatmospheric pressure of 200 mm. Hg —400 mm. Hg.

13. The method of separating methanol from a mixture consisting essentially of methanol, formaldehyde and water in a distillation column as claimed in claim 11 wherein said formaldehyde is stripped from said bottoms at operating pressure of 100 mm. Hg —2 atmospheres.

14. The method of separating methanol from a mixture consisting essentially of methanol, formaldehyde and water in a distillation column which comprises admittting said mixture to a feed point in a column maintained at subatmospheric pressure, admitting aqueous calcium chloride lean liquid to an upper portion of said column whereby an absorption section is formed between said feed point and said point of admission of lean liquid, passing upflowing vapors from said feed point through said absorption section wherein the relative volatility of methanol is substantially greater than that of the formaldehyde and water in the presence of said calcium chloride, withdrawing methanol-containing vapor from above said point of admission of said lean liquid, passing liquid from the bottom of said absorption section of said column through a lower stripping section in said column, withdrawing substantially methanol-free bottoms from said stripping section, and reboiling at least a portion of said withdrawn bottoms whereby said bottoms are stripped of methanol.

15. The method of separating methanol from a mixture consisting essentially of methanol, formaldehyde and water which comprises vaporizing said mixture of methanol, formaldehyde, and water, countercurrently contacting said vapor with a lean liquid containing a water-soluble salt which is chemically inert with respect to methanol and formaldehyde, whereby the relative volatility of methanol with respect to formaldehyde and water is increased in the presence of said salt, withdrawing overhead containing substantially all the methanol from said mixture, stripping the bottoms from said countercurrent contacting operation whereby said bottoms are rendered methanol-free, further stripping aqueous formaldehyde from said methanol-free bottoms, fractionating said aqueous formaldehyde at superatmospheric pressure, and withdrawing concentrated formaldehyde as overhead from said superatmospheric pressure distillation.

16. The method of separating methanol from a mixture consisting essentially of methanol, formaldehyde and water which comprises adding to said mixture a water-soluble salt which is chemically inert with respect to methanol and formaldehyde, having as cation a commonly occurring solid metal selected from the group consisting of those metals in Groups I and II of the periodic table and as anion a radical selected from the group consisting of the sulfate radical, the acetate radical, and the chloride radical whereby the relative volatility of methanol with respect to formaldehyde and water is increased in the presence of said salt, distilling said mixture containing said salt in a distillation operation, withdrawing from said distillation operation an overhead containing substantially all the methanol from said distilled mixture, and withdrawing bottoms from said distillation operation containing substantially methanol-free aqueous formaldehyde.

17. The method of separating methanol from a mixture consisting essentially of methanol, formaldehyde and water which comprises distilling said mixture in direct contact with an aqueous solution of a water-soluble salt which is chemically inert with respect to methanol and formaldehyde, whereby the relative volatility of methanol with respect to said formaldehyde and water is increased in the presence of said salt, withdrawing overhead containing substantially all the methanol from said mixture, returning to said distillation operation at least a portion of said overhead as reflux, adding at least a portion of said water-soluble salt to said reflux, and withdrawing bottoms from said distillation operation containing methanol-free aqueous formaldehyde.

References Cited in the file of this patent

UNITED STATES PATENTS

| | | |
|---|---|---|
| 2,153,526 | Walker | Apr. 4, 1939 |
| 2,565,569 | McCants | Aug. 28, 1951 |
| 2,612,468 | Morrell et al. | Sept. 30, 1952 |

UNITED STATES PATENT OFFICE

CERTIFICATE OF CORRECTION

Patent No. 2,798,033                                              July 2, 1957

Billy E. Lloyd

It is hereby certified that error appears in the printed specification of the above numbered patent requiring correction and that the said Letters Patent should read as corrected below.

Column 1, line 17, for "slats" read -- salts --; line 69, strike out "the presence" and insert instead -- direct contact with an aqueous solution --; column 3, line 47, for "quivalent" read -- equivalent --; column 4, line 26, for "Vapors as" read -- Vapors at --; column 5, line 32, for "remaing" read -- remaining --; column 6, line 75, for "distallation" read -- distillation --.

Signed and sealed this 27th day of August 1957.

(SEAL)
Attest:

KARL H. AXLINE                                          ROBERT C. WATSON
Attesting Officer                                      Commissioner of Patents